(12) United States Patent
Suzuki et al.

(10) Patent No.: US 7,906,611 B2
(45) Date of Patent: Mar. 15, 2011

(54) POLYAMIC ACID AND POLYIMIDE

(75) Inventors: Hideo Suzuki, Funabashi (JP);
Takayuki Tamura, Funabashi (JP);
Kentaro Ohmori, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 357 days.

(21) Appl. No.: 12/295,705

(22) PCT Filed: Feb. 28, 2007

(86) PCT No.: PCT/JP2007/053720
§ 371 (c)(1),
(2), (4) Date: Oct. 1, 2008

(87) PCT Pub. No.: WO2007/113954
PCT Pub. Date: Oct. 11, 2007

(65) Prior Publication Data
US 2009/0182115 A1 Jul. 16, 2009

(30) Foreign Application Priority Data

Apr. 4, 2006 (JP) ................................. 2006-102973

(51) Int. Cl.
*C08G 73/10* (2006.01)
(52) U.S. Cl. ........................ 528/322; 528/310; 528/335
(58) Field of Classification Search ................. 528/310, 528/322, 335
See application file for complete search history.

(56) References Cited

U.S. PATENT DOCUMENTS

| 3,522,160 A * | 7/1970 | Fuss et al. ................. 204/157.69 |
| 4,454,310 A | 6/1984 | Oka et al. |
| 4,879,059 A | 11/1989 | Hanyu et al. |

FOREIGN PATENT DOCUMENTS

| EP | 0 082 724 A1 | 6/1983 |
| JP | 58-208322 A | 12/1983 |
| JP | 63-191129 A | 8/1988 |
| JP | 2-24294 U | 2/1990 |
| JP | 7-152037 A | 6/1995 |
| JP | 9-269491 A | 10/1997 |
| JP | 2000-63519 A | 2/2000 |

OTHER PUBLICATIONS

USPTO structure search, Nov. 2, 2010.*
Hartmann, "Photosensibilisierte Addition von Maleinsäureanhydrid an terminale Alkine," Chem. Ber., vol. 102, 1969, pp. 3974-3984.

* cited by examiner

*Primary Examiner* — Gregory Listvoyb
(74) *Attorney, Agent, or Firm* — Birch, Stewart, Kolasch & Birch, LLP

(57) ABSTRACT

Disclosed are a polyamic acid containing not less than 10 mol % of a repeating unit represented by the formula [1] below, and a polyimide represented by the formula [2] below which is obtained from such a polyamic acid. The polyamic acid and polyimide have high heat resistance as shown by a thermal decomposition temperature of not less than 300° C. In addition, the polyamic acid and polyimide have good workability because of their high solubility in solvents, while exhibiting good light transmission. (In the formula, $R^1$ and $R^2$ independently represent a hydrogen atom or an alkyl group having 1 to 10 carbon atoms; $R^3$ and $R^4$ independently represent a hydrogen atom, a halogen atom, an alkyl group having 1 to 10 carbon atoms or a phenyl group, or alternatively $R^3$ and $R^4$ on adjacent carbon atoms may combine together to form a cycloalkyl group having 3 to 8 carbon atoms or a phenyl group; $R^5$ represents a divalent organic group; and n represents an integer of not less than 2.)

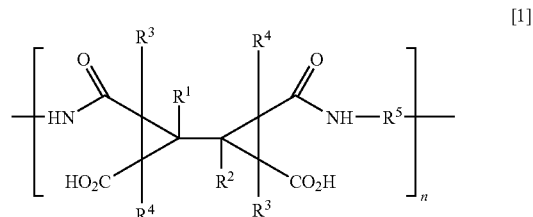

[1]

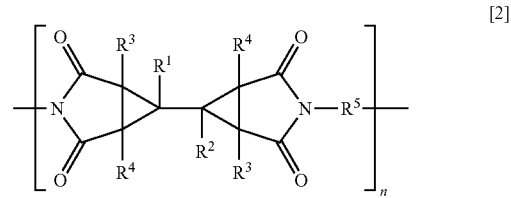

[2]

9 Claims, 4 Drawing Sheets

POLYAMIC ACID AND POLYIMIDE

TECHNICAL FIELD

This invention relates to a polyamic acid and a polyimide and more particularly, to a polyamic acid and a polyimide having an alicyclic structure and suited, for example, for electronic materials.

BACKGROUND ART

In general, polyimide resins have wide utility as electronic materials including protective materials, insulating materials and the like of liquid crystal displays and semiconductors because of their inherent high mechanical strength, heat resistance, insulating properties, and solvent resistance. Recently, applications as a material for optical communication such as a material for optical waveguide have been expected.

In recent years, developments in this field are remarkable and there have been required ever higher characteristics of materials used to meet the developments. More particularly, not only such materials are excellent in heat and solvent resistances, but also they have been expected to have a number of properties varying depending on the intended use.

As an especially important characteristic, mention is made of high transparency. For one of methods of realizing the transparency, it has been already reported that there can be obtained a polyimide having a relatively low degree of coloration and high transparency by subjecting an alicyclic tetracarboxylic acid dianhydride and an aromatic diamine to polycondensation reaction to obtain a polyimide precursor and imidizing the precursor to prepare a polyimide (see Patent Documents 1 and 2).

However, under the recent circumstances wherein there is demanding the use of a polyimide having high heat and solvent resistances and high transparency in the field of electronic materials using light, developments of a novel type of polyimide having excellent characteristics are demanded.

Further, for a method of realizing the transparency, there can be expected a polyimide having high transparency by subjecting an alicyclic tetracarboxylic acid dianhydride and an alicyclic diamine to polycondensation reaction to obtain a wholly alicyclic polyimide precursor and imidizing the precursor to prepare a wholly alicyclic polyimide.

However, the polyimide obtained from 1,2,3,4-cyclobutanetetracarboxylic acid-1,2:3,4-dianhydride (CBDA) that is typical of existing alicyclic tetracarboxylic acid dianhydrides and an alicyclic diamine is brittle and cannot be used as a film. Thus, there has never been found a film of a wholly alicyclic polyimide which ensures stable strength.

It will be noted that there is an instance where bis-1,1'-(cyclopropane-2,3-dicarboxylic acid anhydride) (hereinafter abbreviated as BCPDA) is synthesized by photoreaction of acetylene and maleic anhydride (see Patent Document 3).

However, there is no instance of synthesizing a polyamic acid or polyimide by use of BCPDA.
Patent Document 1:
JP-B 2-24294 (Claims)
Patent Document 2:
JP-A 58-208322 (Claims)
Patent Document 3:
U.S. Pat. No. 3,522,160 (1970)

DISCLOSURE OF THE INVENTION

Problems to be Solved by the Invention

The invention has been made under these circumstances and has for its object the provision of a polyamic acid which has such a high heat resistance that a thermal decomposition temperature is not lower than 300° C., good workability because of solubility in solvents and good optical transparency and also of a polyimide obtained therefrom.

Means for Solving the Problem

We have made intensive studies in order to achieve the above object and, as a result, found that a novel polyimide having a biscyclopropane structure, which is an alicyclic structure, at a given ratio or over has a such a high heat resistance that its thermal decomposition temperature is not lower than 300° C. and also has good solvent solubility and transparency, for which this polyimide can be utilized as an electronic material including a protective material, an insulating material or the like for liquid crystal display elements or semiconductors and also as a material for optical communication such as for an optical waveguide, thereby accomplishing the present invention.

More particularly, the invention provides:
1. A polyamic acid, characterized by including not less than 10 mole % of repeating units represented by the formula [1] and having a number average molecular weight of not smaller than 5000

[Chemical Formula 1]

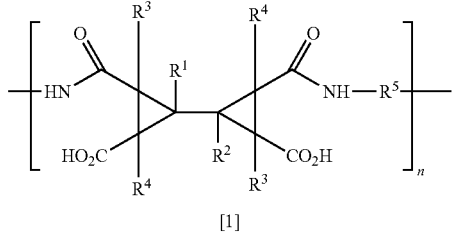

[1]

(wherein $R^1$ and $R^2$ independently represent a hydrogen atom or an alkyl group having 1 to 10 carbon atoms, $R^3$ and $R^4$ independently represent a hydrogen atom, a halogen atom, an alkyl group having 1 to 10 carbon atoms or a phenyl group, or $R^3$ and $R^4$ on adjacent carbon atoms may combine together to form a cycloakyl group having 3 to 8 carbon atoms or a phenyl group, $R^5$ represents a divalent organic group, and n indicates an integer of not less than 2);
2. A polyimide, characterized by including not less than 10 mole % of repeating units represented by the formula [2]

[Chemical Formula 2]

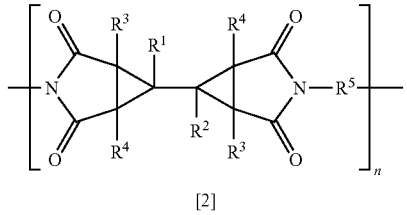

[2]

(wherein $R^1$ and $R^2$ independently represent a hydrogen atom or an alkyl group having 1 to 10 carbon atoms, $R^3$ and $R^4$ independently represent a hydrogen atom, a halogen atom, an alkyl group having 1 to 10 carbon atoms or a phenyl group, or $R^3$ and $R^4$ on adjacent carbon atoms may combine together to form a cycloalkyl group having 3 to 8 carbon atoms or a phenyl group, $R^5$ represents a divalent organic group, and n indicates an integer of not less than 2);
3. A polyamic acid of 1, wherein a number average molecular weight is 5000 or over;
4. A polyamic acid of 1, wherein $R^1$, $R^2$, $R^3$ and $R^4$ are each a hydrogen atom;
5. A polyamic acid of 1, wherein $R^1$ and $R^2$ are each a hydrogen atom and at least one of $R^3$ and $R^4$ is a methyl group;
6. A polyimide of 2, wherein $R^1$, $R^2$, $R^3$ and $R^4$ are each a hydrogen atom;
7. A polyimide of 2, wherein $R^1$ and $R^2$ are each a hydrogen atom and at least one of $R^3$ and $R^4$ is a methyl group;
8. A polyamic acid of 1, wherein $R^5$ in the formula [1] is a divalent organic group derived from an alicyclic diamine or an aliphatic diamine; and
9. A polyimide of 2, wherein $R^5$ in the formula [2] is a divalent organic group derived from an alicyclic diamine or an aliphatic diamine.

Effects of the Invention

The polyamic acid and polyimide of the invention have such a high heat resistance that a thermal decomposition is not lower than 300° C. and also have good solvent solubility and transparency. The polyimide of the invention having such characteristics are expected as having utility, for example, as an electronic material such as a protective material, an insulating material or the like for liquid crystal display elements or semiconductor, or as a material for optical communication such as for optical waveguides.

BEST MODES FOR CARRYING OUT THE INVENTION

Figure 1:
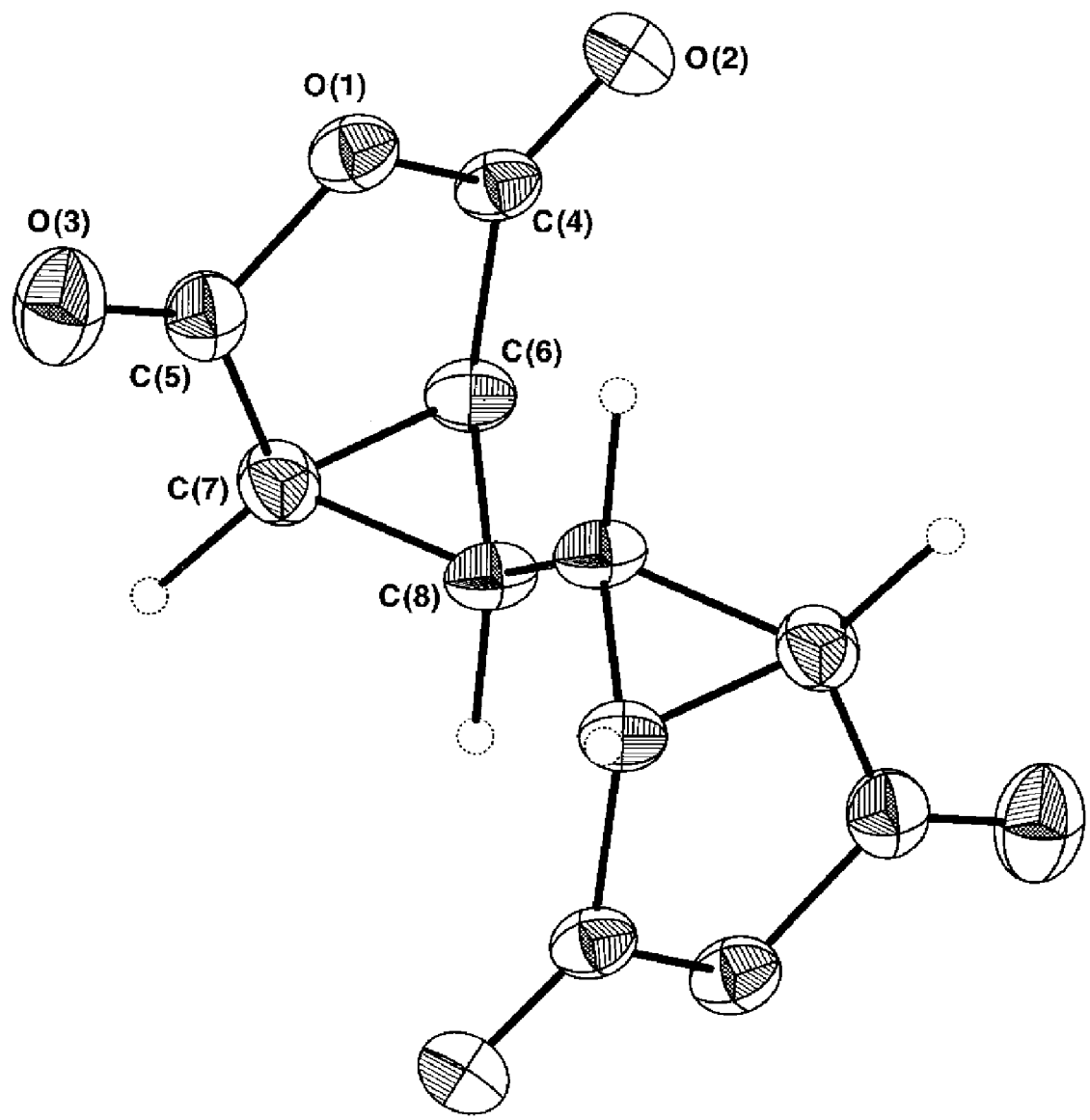
FIG. 1 is an X-ray ORTEP diagram of BCPDA.

The invention is described in more detail.
The polyamic acid of the invention includes not less than 10 mole % of repeating units represented by the formula [1]. The polyimide of the invention is a polyimide derived from the above polyamic acid and includes not less than 10 mole % of repeating units represented by the formula [2].

[Chemical Formula 3]

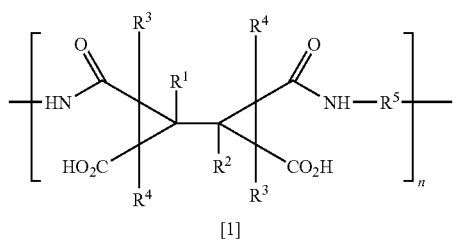

[1]

[Chemical Formula 4]

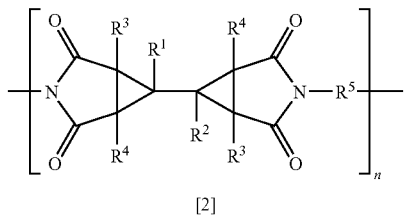

[2]

In the above formulae, $R^1$ and $R^2$ independently represent a hydrogen atom or an alkyl group having 1 to 10 carbon atoms, $R^3$ and $R^4$ independently represent a hydrogen atom, a halogen atom, an alkyl group having 1 to 10 carbon atoms or a phenyl group, or $R^3$ and $R^4$ on adjacent carbon atoms may combine together to form a cycloalkyl group having 3 to 8 carbon atoms or a phenyl group, $R^5$ represents a divalent organic group, and n indicates an integer of not less than 2.

Specific examples of the alkyl group having 1 to 10 carbon atoms include methyl, ethyl, n-propyl, i-propyl, n-butyl, i-butyl, s-butyl, n-amyl, i-amyl, s-amyl, n-hexyl, n-heptyl, n-octyl, n-nonyl, n-decyl and the like.

The cycloalkyl group having 3 to 8 carbon atoms includes cyclopropyl, cyclobutyl, cyclopentyl, cyclohexyl, cycloheptyl, cyclooctyl or the like.

The halogen atom includes F, Cl, Br or I.

Taking the ease in availability of starting materials and production yield into consideration, $R^1$ and $R^2$ are preferably a hydrogen atom, $R^3$ and $R^4$ are preferably a hydrogen atom or a methyl group, and especially, compounds of the formulae wherein all of $R^1$ to $R^4$ are a hydrogen atom or compounds of the formulae wherein $R^1$ and $R^2$ are each a hydrogen atom and at least one of $R^3$ and $R^4$ is a methyl group are more preferred.

The divalent organic group is one that is derived from an organic diamine to be reacted with a dicarboxylic acid dianhydride (BCPDA compound).

The diamines yielding this divalent organic group may be various types of diamines used for existing polyimide preparation. Examples include: aromatic diamines such as p-phenylenediamine (p-PDA), m-phenylenediamine, 2,5-diaminotoluene, 2,6-diaminotoluene, 1,3-bis(4,4'-aminophenoxy)benzene (DA-4P), 4,4'-diamino-1,5-phenoxypentane (DA-5MG), 4,4'-diaminobiphenyl, 3,3'-dimethyl-4,4'-diaminobiphenyl, 3,3'-dimethoxy-4,4'-diaminobiphenyl, 4,4'-diaminodiphenyl ether (DDE), 4,4'-diaminodiphenylmethane (DDM), 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2'-trifluoromethyl-4,4'-diaminobiphenyl and the like;

alicyclic diamines such as 1,4-diaminocyclohexane, 1,4-cyclohexanebis(methylamine), 4,4'-diaminodicyclohexylmethane, bis(4-amino-3-methylcyclohexyl)methane, 3(4),8(9)-bis(aminomethyl)tricyclo[5.2.1.0$^{2,6}$]decane, 2,5(6)-bis(aminomethyl)bicyclo[2.2.1]heptane, 1,3-diaminoadamantan, 3,3'-diamino-1,1'-biadamantyl, 1,6-diaminodiamantan, 1,6-aminopentanecyclo[7.3.1.1$^{4,12}$,0$^{2,7}$0.0$^{6,11}$]tetradecane and the like; and aliphatic diamines such as tetramethylenediamine, hexamethylenediamine and the like.

It will be noted that these diamines can be used singly or in combination of two or more for the preparation of polyamic acid (polyimide) provided that if two or more of the diamines are used in admixture, $R^5$ is a combination of two or more groups.

When an alicyclic diamine or aliphatic diamine is used as selected from these diamines, the resulting polyamic acid or a polyimide obtained therefrom according to the invention exhibits higher transparency and is thus preferred.

Although n may be an integer of not less than 2, n is preferably an integer of 10 to 1000, more preferably 20 to 1000 when taking the molecular weight of polyamic acid described later into account.

When taking the strength and workability upon film formation after conversion to a polyimide film into consideration, the molecular weight of polyamic acid preferably ranges 2500 to 250000 in terms of number average molecular weight, more preferably 5000 to 250000.

It will be noted that the number average molecular weight is a measurement by gel permeation chromatography (hereinafter referred to as GPC).

For similar reasons as set out above, the degree of polymerization of polyimide is preferably at 0.05 to 5.0 dl/g (at a concentration of 0.5 g/dl in N-methylpyrrolidone at a temperature of 30° C.), calculated as a reduced viscosity of a polyamic acid solution.

The polyamic acid (polyimide) of the invention should contain not less than 10 mole % of a repeating structure represented by the afore-indicated formula [1] (formula [2]1). Especially, in order to provide a polyimide having high heat resistance and transparency and excellent solubility in solvent, it is preferred that the above structure is contained in amounts not less than 50 mole %, more preferably not less than 70 mole % and most preferably not less than 90 mole %.

The polyimide of the invention can be used by reacting a BCPDA compound and, if necessary, other types of tetracarboxylic acid derivatives, and the above-indicated diamines in a solvent to obtain a polyamic acid of the invention, followed by thermal imidization of the polyamic acid. Alternatively, the polyamic acid may be converted to an imide in a solvent for use as a solvent-soluble polyimide.

The process of preparing a polyamic acid is not critical and the polyamic acid can be obtained, for example, by solution polymerization of a BCPDA compound and, if necessary, other type of tetracarboxylic acid derivative, and a diamine.

It is to be noted that in the practice of the invention, the BCPDA compound is used in an amount of at least 10 mole % based on the total moles of the tetracarboxylic acid derivatives.

The preparation of the BCPDA compound is initially illustrated. The BCPDA compound can be prepared according to the following scheme.

[Chemical Formula 5]

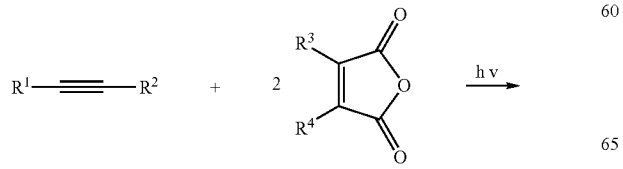

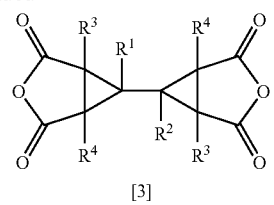

[3]

(wherein $R^1$ to $R^4$, respectively, have the same meanings as defined before,)

That is, this is a procedure of photoreaction between an acetylene derivative and a maleic anhydride derivative. In this case, the photoreaction is preferably carried out in coexistence of a photosensitizer such as benzophenone, acetophenone or the like. The light source used is preferably a high pressure mercury lamp.

As a reaction solvent, there is preferably used a lower ketone compound such as acetone, methyl ethyl ketone or the like.

The reaction temperature preferably ranges −20 to 60° C., more preferably 0 to 40° C.

The most economical starting materials used as an acetylene derivative and an maleic anhydride derivative are acetylene and maleic anhydride wherein $R^1$ to $R^4$ are all a hydrogen atom, and three isomers are known as represented by the steric structural formula of the product obtained in this case, i.e. unsubstituted BCPDA [see Willy Hartmann, Chem. Ber., 102, 3974-3984 (1969)].

As will be described hereinafter, according to our study, it has also been confirmed that BCPDA obtained by photoreaction includes three isomers. Moreover according to the X-ray structural analysis, it has been confirmed that the main component is of the cis, cis-type (see FIG. 1).

Accordingly, the BCPDA compound represented by plane structural formula [3] containing substituents is one which contains the following steric isomers.

[Chemical Formula 6]

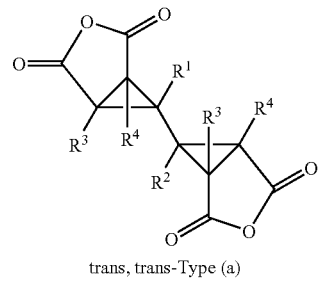

trans, trans-Type (a)

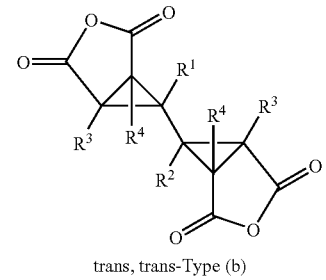

trans, trans-Type (b)

-continued

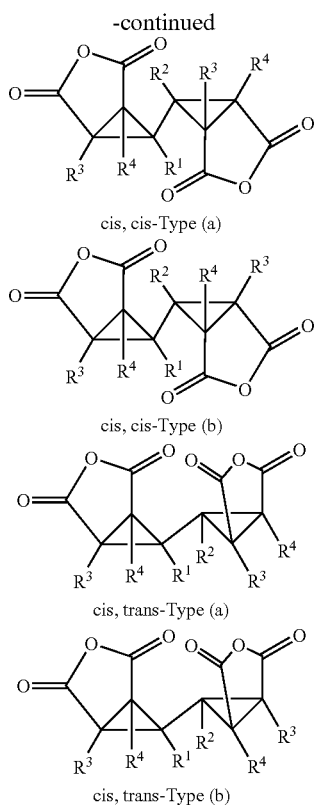

cis, cis-Type (a)

cis, cis-Type (b)

cis, trans-Type (a)

cis, trans-Type (b)

These may be likewise used as a monomer for polycondensation reaction with diamine compounds either singly or in admixture.

The polyamic acid represented by the plane structural formula (1) of the invention and the polyimide represented by the plane structural formula [2], both of which are prepared by use of these acid dianhydrides, contain steric isomers corresponding to the acid dianhydride used, respectively.

Specific examples of other types of tetracarboxylic acid derivatives used as required include: alicyclic tetracarboxylic acids such as 1,2,3,4-tetracarboxylic acid, 2,3,4,5-tetrahydrofurantetracarboxylic acid, 1,2,4,5-cyclohexanoic acid, 3,4-dicarboxy-1-cyclohexylsuccinic acid, 3,4-dicarboxy-1,2,3, 4-tetrahydro-1-naphthalenesuccinic acid, bicyclo[3.3.0]octane-2,4,6,8-tetracarboxylic acid and the like, and dianhydrides and dicarboxylic acid diacid halides thereof; and aromatic tetracarboxylic acids such as pyromellitic acid, 2,3,6,7-naphthalenetetracarboxylic acid, 1,2,5,6-naphthalenetetacarboxylic acid, 1,4,5,8-naphthalenetetracarboxylic acid, 2,3,6,7-anthracenetetracarboxylic acid, 1,2,5,6-anthracenetetracarboxylic acid, 3,3',4,4'-biphenyltetracarboxylic acid, 2,3,3',4'-biphenyltetracarboxylic acid, bis(3,4-dicarboxyphenyl)ether, 3,3',4,4'-benzophenonetetracarboxylic acid, bis(3,4-dicarboxyphenyl)methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenyl)diphenylsilane, 2,3,4,5-pyridinetetracarboxylic acid, 2,6-bis(3,4-dicarboxyphenyl) pyridine and the like, and dianhydride and dicarboxylic acid diacid halides thereof.

At the time when a polyamic acid is prepared, the molar ratio between the BCPDA compound and other type of tetacarbocylic acid dianhydride and a diamine is preferably at 0.8 to 1.2. Like an ordinary polycondensation reaction, a molar ratio closer to 1 results in a greater degree of polymerization of the resulting polymer. If the degree of polymerization is too small, there may occur the case where the strength of the polyimide film becomes unsatisfactory. On the other hand, when the degree of polymerization is too great, there may occur the case where the workability becomes worsened upon formation of polyimide film.

The temperature of solution polymerization may be arbitrarily selected from a temperature range of −20 to 150° C. and is preferably in the range of −5 to 100° C.

Specific examples of the solvent usable for the solution polymerization include m-cresol, N-methyl-2-pyrrolidone, N,N-dimethylformamide, N,N-dimethylacetamide, N-methylcaprolactam, dimethylsulfoxide, tetramethylurea, pyridine, dimethylsulfone, hexamethylphosphoramide (HMPA), γ-butyrolactone and the like. These maybe used singly or in admixture of two or more. Moreover, a solvent not dissolving a polyamic acid may be added to the above-indicated solvent within a range where a uniform solution is obtained.

Although the manner of converting a polyamic acid to a polyimide is not critical, it is usual to adopt a process wherein the polyamic acid obtained as stated hereinabove is dehydrated and ring-closed by heating. There may also be adopted a process of chemical ring-closure by use of a known a dehydrating and ring-closing catalyst.

The ring-closing temperature by heating can be arbitrarily selected from a range of 100 to 300° C., preferably 120 to 250° C.

With the case of the chemical ring closure, the dehydrating and ring-closing catalyst used includes, for example, pyridine, triethylamine, acetic anhydride or the like. The reaction temperature may be arbitrarily selected from a range of −20 to 200° C.

The polyimide solution obtained in this way may be used as it is or may be used either as a powder by adding thereto a poor solvent such as methanol, ethanol or like, thereby precipitating a polyimide isolated as a powder, or as a solution by re-dissolving the polyimide powder in an appropriate solvent.

The solvents used for the re-dissolution are not critical so far as they are able to dissolve the polyimide obtained and include, for example, m-cresol, 2-pyrrolidone, N-methylpyrrolidone, N-ethylpyrrolidone, N-vinylpyrrolidone, N,N-dimethylacetamide, N,N-dimethylformamide, hexamethylphosphoramide (HMPA), γ-butyrolactone and the like.

A solvent that is not able to dissolve a polyimide when used singly may be used by addition to the above-indicated solvent within a range not impeding the solubility of the latter solvent. Specific examples of such a solvent include ethyl cellosolve, butyl cellosolve, ethyl carbitol, butyl carbitol, ethyl carbitol acetate, ethylene glycol, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy)propanol, methyl lactate, ethyl lactate, n-propyl lactate, n-butyl lactate, isoamyl lactate and the like.

For the purpose of further improving adhesion between a polyimide film and a substrate, additives such as a coupling agent may be added to the thus obtained polyimide solution.

The polyimide solution of the invention can be coated onto a substrate and the solvent is evaporated to form a polyimide film on the substrate. The temperature for the evaporation of the solvent is generally in the range of about 100 to 300° C.

EXAMPLES

The invention is more particularly described by way of Synthetic Examples and Examples, which should not be construed as limiting the invention thereto. The devices of measuring physical properties and conditions in the Examples are as shown below.

[1] Molecular weight
Device: Normal temperature GPC measuring device (SSC-7200, made by Senshu Scientific Co., Ltd.)
Eluent: DMF

[2] TG/DTA (Thermogravimetry/differential thermal analyzer)
Device: Thermoplus TG8120 (made by AMEFREC Co., Ltd.)

[3] NMR
Device: JNM-LA 400 FT-NMR system (made by JOEL)
Solvent for measurement: DMSO-$d_6$

[4] Single-crystal X ray
Device: DIP 2030 (made by Mac Science Co., Ltd.)
X-ray: MoKα (40 kV, 200 mA)
Temperature: room temperature

[5] FT-IR
Device: NICOLET 5700 (Thermo Electron Corporation)

[6] Film thickness
Device: Surfcorder ET 4000A
(fully automatic microshape measuring device)
(made by Kosaka Laboratory Ltd.)

[7] UV-Vis spectrum
Device: UV-VIS-NIR Scanning Spectrophotometer
(self-recording spectrophotometer)
(made by Shimadzu Corporation)

Synthetic Example 1

Synthesis of BCPDA

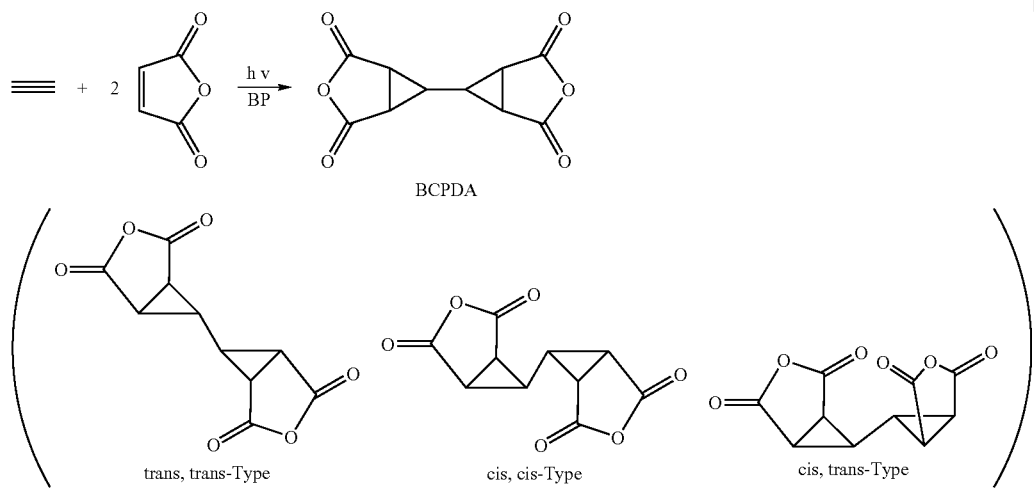

Into a 200 ml Pyrex (registered trademark) photoreactor, 150 ml of acetone was charged 5.84 g (0.224 mols) of acetylene was dissolved therein at 15° C. Subsequently, 20 g (0.204 mols) of maleic anhydride and 8.0 g (40 wt %) of benzophenone were charged and dissolved under stirring, followed by irradiation with a 100 W high pressure mercury lamp (internal irradiation) for 40 hours.

After the reaction, the reaction solution was concentrated, and 20 g of acetone was dropped to the resulting precipitated crystals and the resulting suspension was washed, followed by drying to obtain 5.9 g (yield of 26%) of white crystals. The crystals were subjected to GC measurement, revealing three types of peaks (76/23/1) that were considered to correspond to the above-indicated three types of isomers. Moreover, an experiment was carried out on a similar scale, thereby obtaining 5.8 g (yield of 26%) of crystals.

These crystals were dissolved in acetonitrile (to which acetic anhydride was added) and naturally concentrated to obtain a single crystal. This single crystal was subjected to X-ray structural analysis, confirming that the main component was of the cis-cis type (see FIG. 1).

TABLE 1

Crystallographic parameters of BCPDA

| Molecule | $C_{10}H_6O_4$ |
|---|---|
| Crystalline system | Orthorhombic |
| Space group | Pbca |
| Lattice constant | a (Å) = 10.427 (1) |
| | b (Å) = 8.090 (1) |
| | c (Å) = 10.754 (1) |
| | v (Å$^3$) = 907.1 (2) |
| Z | 4 |
| R | 0.10 |

Example 1

Synthesis of BCPDA-p-PDA Polyamic Acid and Polyimide

[Chemical Formula 7]

[Chemical Formula 8]

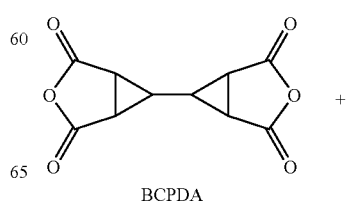

BCPDA

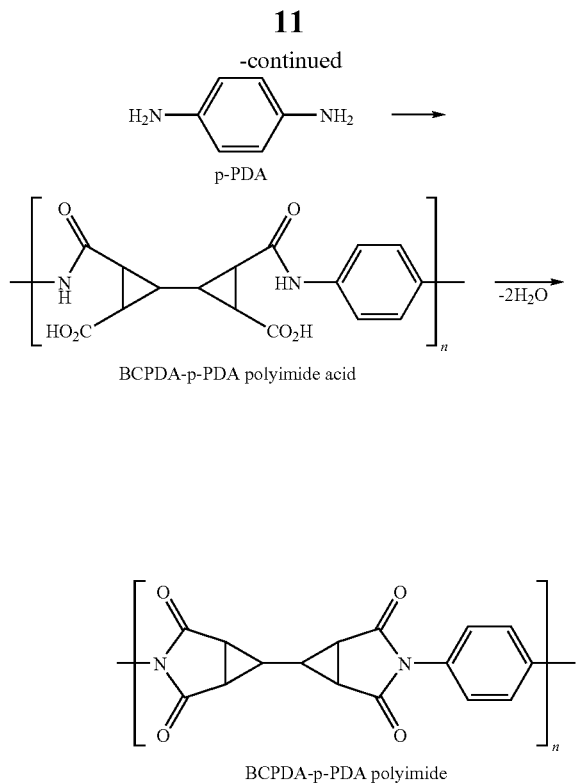

BCPDA-p-PDA polyimide acid

BCPDA-p-PDA polyimide

Example 2

Synthesis of BCPDA-DDE Polyamic Acid and Polyimide

[Chemical Formula 9]

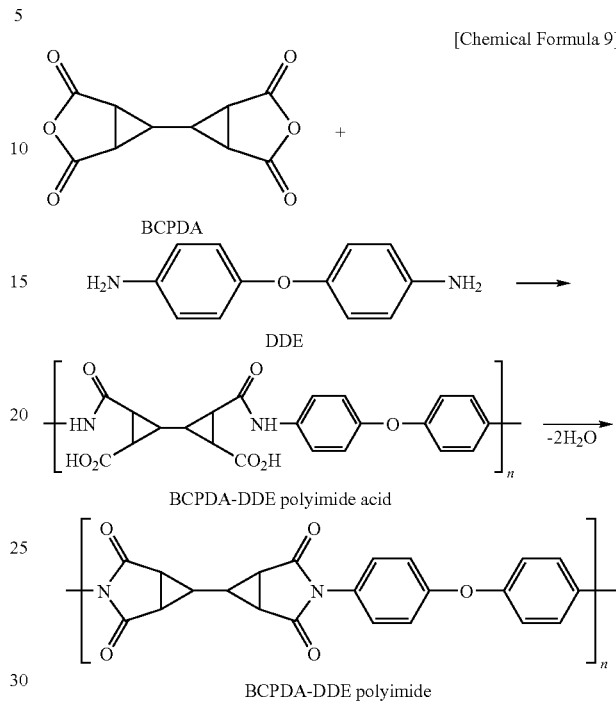

BCPDA-DDE polyimide acid

BCPDA-DDE polyimide

Into a dried four-necked reaction flask, 0.432 g (4.00 mmols) of p-phenylenediamine (p-PDA) and 8.8 g (solid content of 13 wt %) of 1-methyl-2-pyrrolidone (NMP) were charged followed by dissolution under stirring at 20° C. (room temperature) by use of a mechanical stirrer. Subsequently, 0.889 g (4.00 mmols) of BCPDA was added to and stirred at 20° C. at a rate of 180 rpm for 24 hours by use of the mechanical stirrer.

Further, 16.3 g (solid content of 5 wt %) of NMP was added to and stirred, after which the resulting BCPDA-p-PDA polyamic acid polymerization solution was sampled, followed by the measurement of molecular weight. The results of the a GPC measurement revealed that the number average molecular weight (Mn) was at 8,166 and the weight average molecular weight (Mw) was at 15,564 with Mw/Mn being at 2.38558.

Further, 5.30 g (13 equivalents) of acetic anhydride and 1.33 g (4 equivalents) of sodium acetate were added to the polyamic acid polymerization solution, followed by raising a bath temperature to 130° C. and stirring over 4 hours. The resulting reaction solution was cooled down to room temperature and then dropped in 92 ml of water being stirred, followed by stirring for 30 minutes to obtain a brown suspension. After filtration, the resulting powder was washed with 50 ml of water and further with methanol (first time: 50 ml, second time: 20 ml), followed by drying under reduced pressure to obtain 1.15 g of a dark brown powder of BCPDA-p-PDA polyimide. This powder was slightly dissolved in DMSO-$d_6$ upon heating. The imidization rate calculated from $^1$H-NMR was found to be at 86.2%.

It will be noted that thermal characteristics are those indicated below.

5% weight loss temperature ($T_5$): 405.4° C.

10% weight loss temperature ($T_{10}$): 433° C.

Into a dried four-necked reaction flask, 0.801 g (4.00 mmols) of 4,4'-diaminodiphenyl ether (DDE) and 6.76 g (solid content of 20 wt %) of NMP were charged followed by dissolution under stirring at 20° C. (room temperature) by use of a mechanical stirrer. Subsequently, 0.889 g (4.00 mmols) of BCPDA was added to and stirred at 20° C. at a rate of 180 rpm for 24 hours by use of the mechanical stirrer.

Further, 25.3 g (solid content of 5 wt %) of NMP was added to and stirred, after which the resulting BCPDA-DDE polyamic acid polymerization solution was sampled, followed by the measurement of molecular weight. The results of the GPC measurement revealed that the number average molecular weight (Mn) was at 15,501 and the weight average molecular weight (Mw) was at 38,217 with Mw/Mn being at 2.46538.

Further, 5.30 g (13 equivalents) of acetic anhydride and 1.33 g (4 equivalents) of sodium acetate were added to the polyamic acid polymerization solution, followed by raising a bath temperature to 130° C. and stirring over 4 hours. The resulting reaction solution was cooled down to room temperature and then dropped in 140 ml of water being stirred, followed by stirring for 30 minutes to obtain a suspended gray powder. After filtration, the powder was washed twice with 50 ml of water and further three times with 50 ml of methanol, followed by drying under reduced pressure to obtain 1.50 g of a light purple powder of BCPDA-DDE polyimide.

The results of the GPC measurement revealed that the number average molecular weight (Mn) was at 24,304 and the weight average molecular weight (Mw) was at 55,603 with Mw/Mn being at 2.28785. The imidization rate calculated from $^1$H-NMR was at 99.2%.

It will be noted that thermal characteristics are those indicated below.

5% weight loss temperature ($T_5$): 405.1° C.

10% weight loss temperature ($T_{10}$): 425.3° C.

Example 3

Synthesis of BCPDA-DA-5MG Polyamic Acid and Polyimide

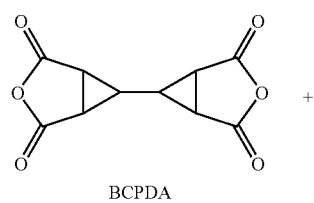
BCPDA

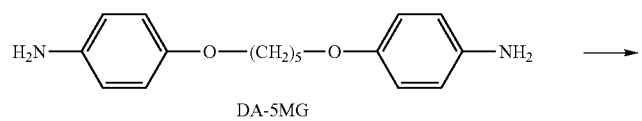
DA-5MG

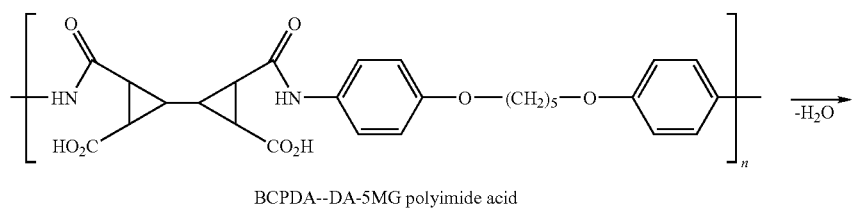
BCPDA--DA-5MG polyimide acid

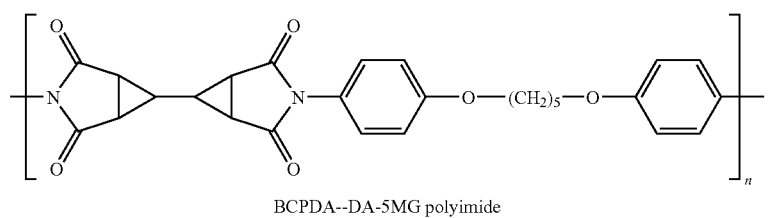
BCPDA--DA-5MG polyimide

Into a dried four-necked reaction flask, 1.15 g (4.00 mmols) of 4,4'-diamino-1,5-phenoxypentane (DA-5MG) and 8.0 g (solid content of 20 wt %) of NMP were charged followed by dissolution under stirring at 20° C. (room temperature) by use of a mechanical stirrer. Subsequently, 0.889 g (4.00 mmols) of BCPDA was added to and stirred at 20° C. at a rate of 180 rpm for 24 hours by use of the mechanical stirrer.

Further, 25.3 g (solid content of 5 wt %) of NMP was added to and stirred, after which the resulting BCPDA-DA-5MG polyamic acid polymerization solution was sampled, followed by the measurement of molecular weight. The results of the GPC measurement revealed that the number average molecular weight (Mn) was at 16,682 and the weight average molecular weight (Mw) was at 39,326 with Mw/Mn being at 2.35735.

Further, 5.30 g (13 equivalents) of acetic anhydride and 1.33 g (4 equivalents) of sodium acetate were added to the polyamic acid polymerization solution, followed by raising a bath temperature to 130° C. and stirring over 4 hours. The resulting reaction solution was cooled down to room temperature and then dropped in 167 ml of water being stirred, followed by stirring for 30 minutes to obtain a suspended gray powder. After filtration, the powder was washed twice with 50 ml of water and further twice with 50 ml of methanol, followed by drying under reduced pressure to obtain 1.87 g of a light brown powder of BCPDA-DA-5MG polyimide.

The results of the GPC measurement revealed that the number average molecular weight (Mn) was at 21,019 and the weight average molecular weight (Mw) was at 44,169 with Mw/Mn being at 2.10144. The imidization rate calculated from $^1$H-NMR was at 98.5%.

It will be noted that thermal characteristics are those indicated below.

5% weight loss temperature ($T_5$): 399.4° C.
10% weight loss temperature ($T_{10}$): 428.2° C.

Example 4

Synthesis of BCPDA-DA-4P Polyamic Acid and Polyimide

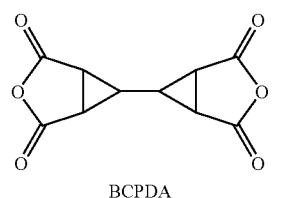
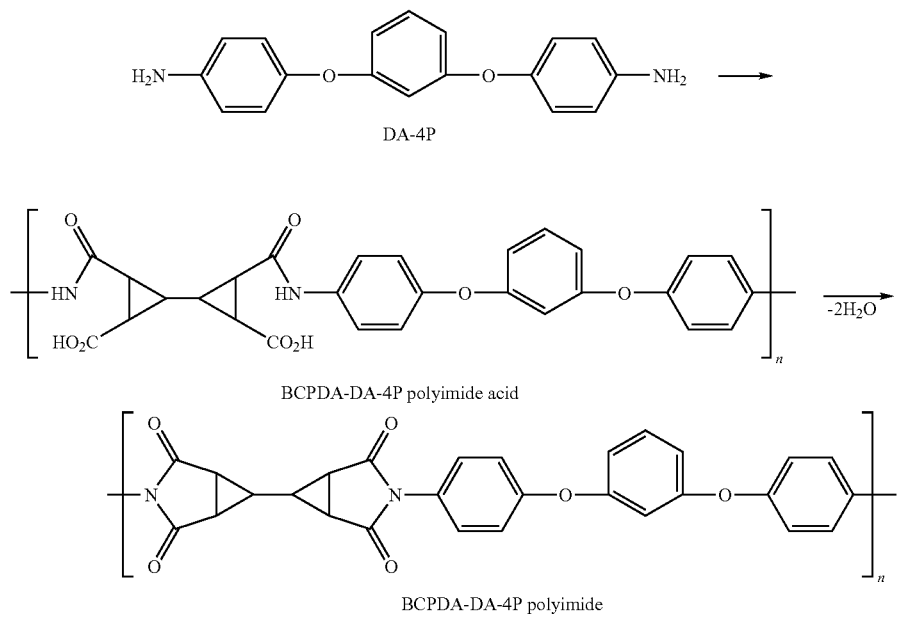

Into a dried four-necked reaction flask, 1.12 g (4.00 mmols) of 1,3-bis(4,4'-aminophenoxy)benzene (DA-4P) and 8.00 g (solid content of 20 wt %) of NMP were charged followed by dissolution under stirring at 20° C. (room temperature) by use of a mechanical stirrer. Subsequently, 0.889 g (4.00 mmols) of BCPDA was added to and stirred at 20° C. at a rate of 180 rpm for 24 hours by use of the mechanical stirrer.

Further, 25.3 g (solid content of 5 wt %) of NMP was added to and stirred, after which the resulting BCPDA-DA-4P polyamic acid polymerization solution was sampled, followed by the measurement of molecular weight. The results of the GPC measurement revealed that the number average molecular weight (Mn) was at 15,188 and the weight average molecular weight (Mw) was at 36,232 with Mw/Mn being at 2.38558.

Further, 5.30 g (13 equivalents) of acetic anhydride and 1.33 g (4 equivalents) of sodium acetate were added to the polyamic acid polymerization solution, followed by raising a bath temperature to 130° C. and stirring over 4 hours. The resulting reaction solution was cooled down to room temperature and then dropped in 163 ml of water being stirred, followed by stirring for 30 minutes to obtain a suspended gray powder. After filtration, the powder was washed twice with 50 ml of water and further twice with 50 ml of methanol, followed by drying under reduced pressure to obtain 1.84 g of a gray powder of BCPDA-DA-4P polyimide.

The results of the GPC measurement revealed that the number average molecular weight (Mn) was at 16,508 and the weight average molecular weight (Mw) was at 36,422 with Mw/Mn being at 2.20631. The imidization rate calculated from $^1$H-NMR was at 99.5%.

It will be noted that thermal characteristics are those indicated below.

5% weight loss temperature ($T_5$): 417.0° C.
10% weight loss temperature ($T_{10}$): 449.2° C.

The solubilities of the polyimides of BCPDA and the respective diamines obtained in the above examples in different types of solvents were evaluated, with the results shown in Table 2.

As shown in Table 2, the polyimides of BCPDA and the respective diamines exhibit solubility in part of polar organic solvents.

TABLE 2

| Example | Type of diamine | Dimethyl-sulfoxide | N,N-dimethyl-formamide | 1-methyl-2-pyrrolidone | Pyridine | Tetra-hydrofuran | Chloro-form | Acetone | Methanol |
|---|---|---|---|---|---|---|---|---|---|
| 1 | p-PDA | + | − | − | − | − | − | − | − |
| 2 | DDE | ++ | ++ | ++ | + | − | − | − | − |
| 3 | PA-5MG | ++ | ++ | ++ | ++ | − | − | − | − |
| 4 | DA-4P | ++ | ++ | ++ | ++ | − | − | − | − |

++: soluble at 25° C.
+: partially soluble at 25° C.
−: insoluble under heating conditions

Example 5

Synthesis of BCPDA-DDE Polyamic Acid and Polyimide

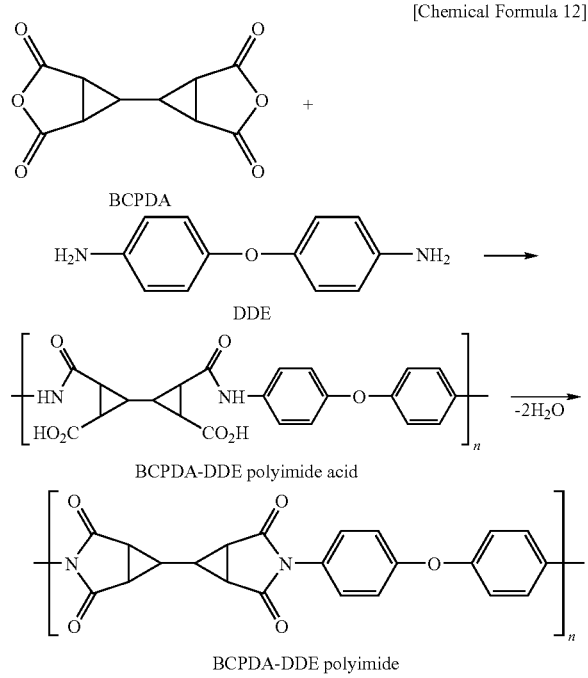

[Chemical Formula 12]

<Synthesis of Polyamic Acid>

Into a dried four-necked reaction flask, 0.801 g (4.00 mmols) of 4,4'-diaminophenyl ether (DDE) and 6.76 g (solid content of 20 wt %) of NMP were charged followed by dissolution under stirring at 20° C. (room temperature) by use of a mechanical stirrer. Subsequently, 0.889 g (4.00 mmols) of BCPDA was added to and stirred at 18° C. at a rate of 160 rpm for 48 hours by use of the mechanical stirrer.

The results of GPC measurement of the resulting BCPDA-DDE polyamic acid polymerization solution revealed that the number average molecular weight (Mn) was at 21,502 and the weight average molecular weight (Mw) was at 22,149 with Mw/Mn being at 1.030.

<Formation of Polyimide Films>

The thus obtained BCPDA-DDE polyamic acid polymerization solution was coated onto 8 cm×10 cm glass plates by use of (1) 25 μm doctor blade and (2) 200 μm doctor blade, respectively, followed by baking at 100° C. for 30 minutes and then at 250° C. for 1 hour on a hot plate to form polyimide films.

<Measurement of Polyimide Film Thickness>

As a result of measurement of the film thickness by use of a fully automatic microshape measuring device, the thickness of the film obtained by coating the amic acid at (1) 25 μm was 3.2 μm and that of the film obtained by coating at (2) 200 μm was 24.3 μm.

<Measurement of Imidization Rate>

The polyimide films were, respectively, subjected to measurement of FT-IR and imidization rates were calculated from the resulting absorption spectra, revealing that with (1) the film thickness of 3.2 μm, the rate was at 97% and with (2) the film thickness of 24.3 μm, the rate was at 100%. (calculation was made using an area of 1630 to 1650 cm$^{-1}$ for absorptions of the residual amide and an area of 1774 to 1698 cm$^{-1}$ for the formed imide.)

<Measurement of Optical Transmittance>

Figure 2:
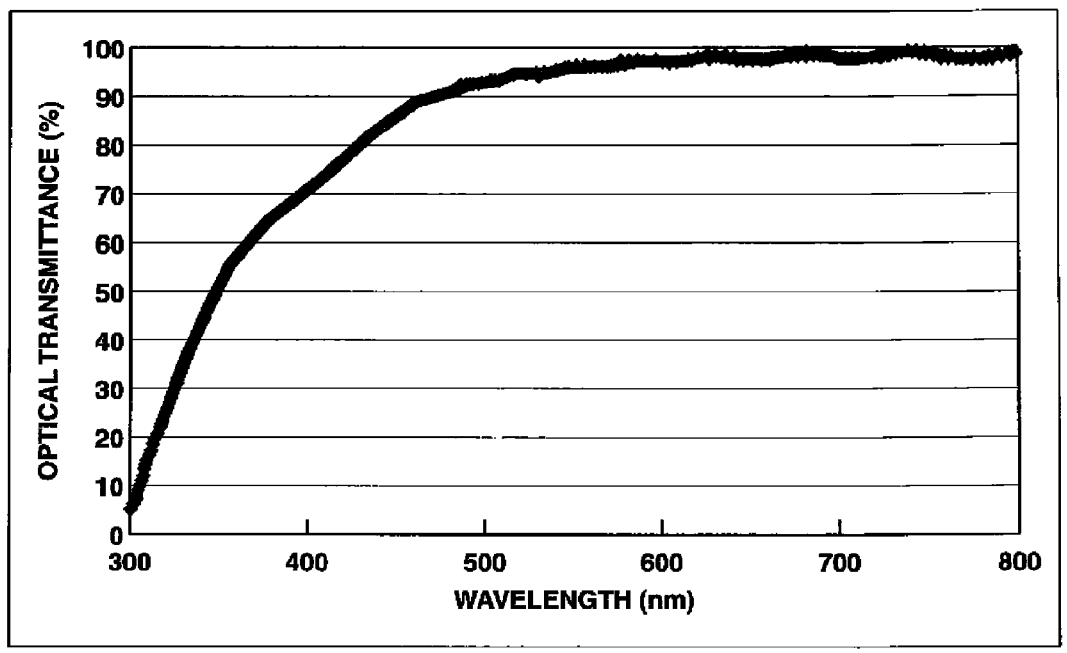
FIG. 2 is a UV-Vis spectrum chart of a 3.2 μm thick BCPDA/DDE polyimide.

As a result of measurement of UV-Vis spectra, the optical transmittance at 400 nm was at 72% for (1) the film thickness of 3.2 μm (see FIG. 2).

Example 6

Synthesis of BCPDA-DDE Polyamic Acid and Polyimide

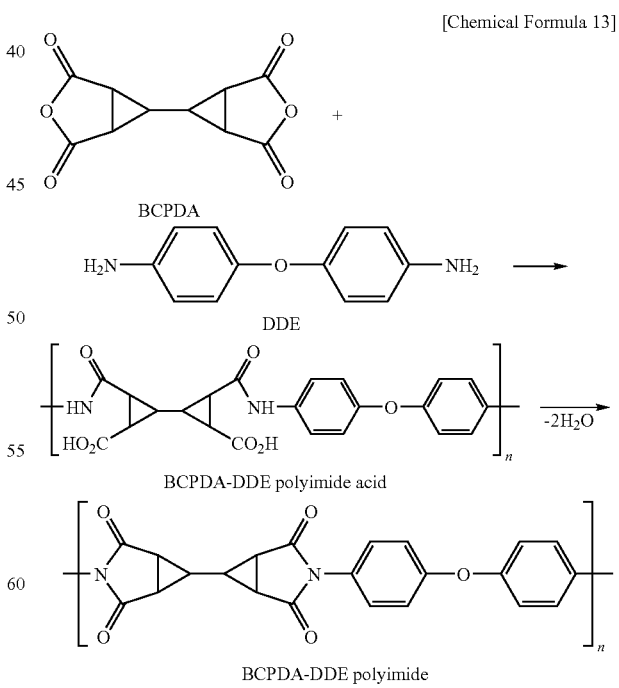

[Chemical Formula 13]

Into a dried four-necked reaction flask, 0.401 g (2.00 mmols) of 4,4'-diaminophenyl ether (DDE) and 7.6 g (solid content of 10 wt %) of NMP were charged followed by dissolution under stirring at 18° C. (room temperature) by use of a mechanical stirrer. Subsequently, 0.444 g (2.00 mmols) of BCPDA was added to and stirred at 18° C. at a rate of 160 rpm for 24 hours by use of the mechanical stirrer.

The results of GPC measurement of the resulting BCPDA-DDE polyamic acid polymerization solution revealed that the number average molecular weight (Mn) was at 15,733 and the weight average molecular weight (Mw) was at 16,162 with Mw/Mn being at 1.027.

Next, polyimide films were formed in the same way as in Example 5 and subjected to measurements of film thickness, imidization rate and optical transmittance, with the results shown in the following table.

TABLE 3

| Polyimide film | Doctor Blade (μm) | Film thickness (μm) | Imidization rate (%) | Optical Transmittance (%) | |
|---|---|---|---|---|---|
| | | | | 350 (nm) | 400 (nm) |
| 1 | 25 | 0.552 | 99 | 84 | 91 |
| 2 | 200 | 8.46 | 98 | — | 57 |

Figure 3:
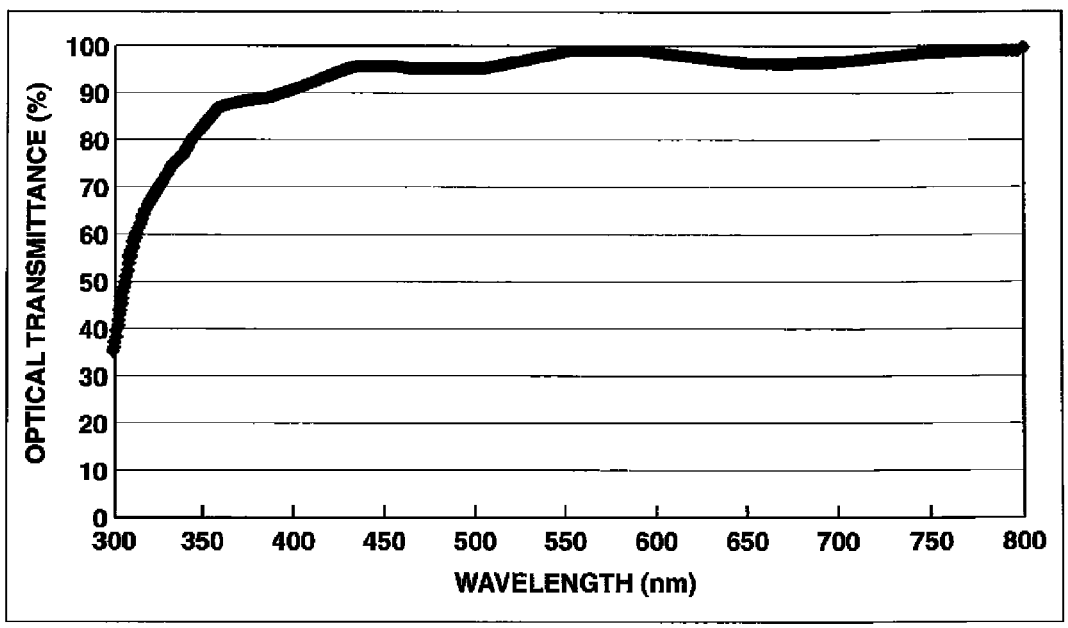
FIG. 3 is a UV-Vis spectrum chart of a 0.552 μm thick BCPDA/DDE polyimide.

With the polyimide film having a thickness of 0.552 μm, the optical transmittance at 350 nm arrived at 84% (see FIG. 3).

Further, the BCPDA-DDE polyamic acid solution was coated onto a glass plate by use of a 200 μm doctor blade and baked on a hot plate at 100° C. for 30 minutes and then at 160° C. for 1 hour to form a polyimide film. The results are shown in the following table.

TABLE 4

| Polyimide film | Doctor Blade (μm) | Film thickness (μm) | Imidization rate (%) | Optical Transmittance (%) | | |
|---|---|---|---|---|---|---|
| | | | | 350 (nm) | 400 (nm) | 450 (nm) |
| 3 | 200 | 10.0 | 51 | 48 | 70 | 83 |

Figure 4:
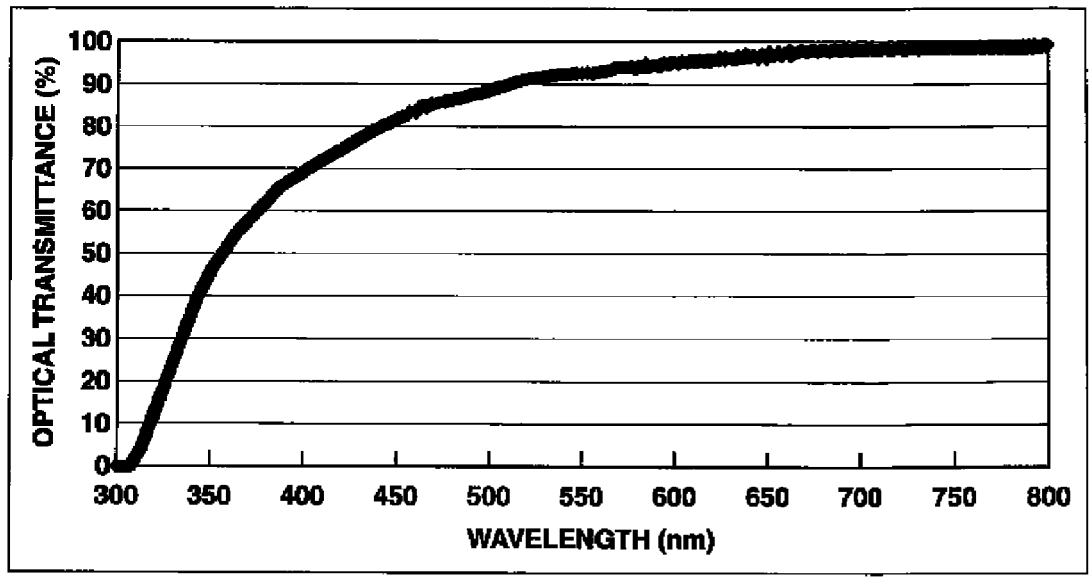
FIG. 4 is a UV-Vis spectrum chart of a 10.0 μm thick BCPDA/DDE polyimide.

With the polyimide film having a thickness of 10.0 μm, the optical transmittance at 450 nm arrived at 83% (see FIG. 4).

Example 7

Synthesis of BCPDA-DCHM Polyamic Acid and Polyimide

[Chemical Formula 14]

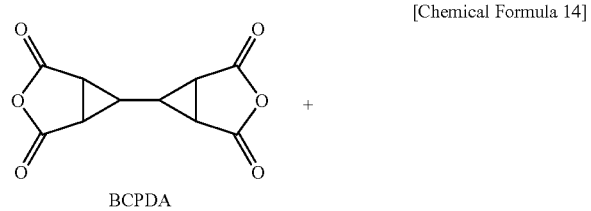

BCPDA

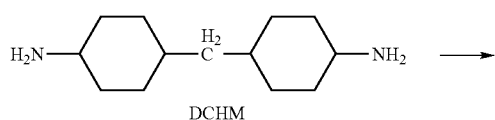

DCHM

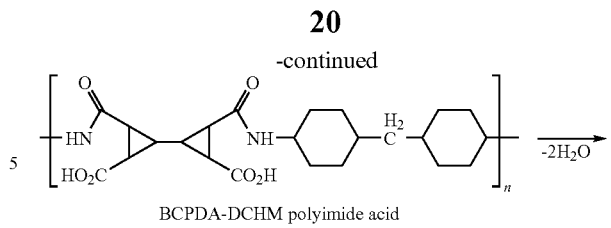

BCPDA-DCHM polyimide acid

BCPDA-DCHM polyimide

Into a dried four-necked reaction flask, 0.421 g (2.00 mmols) of 4,4'-diaminodicyclohexylmethane (DCHM) and 8.65 g (solid content of 10 wt %) of cresol were charged followed by dissolution under stirring at 18° C. (room temperature) by use of a mechanical stirrer. Subsequently, 0.444 g (2.00 mmols) of BCPDA was added to and stirred at 18° C. at a rate of 160 rpm for 24 hours by use of the mechanical stirrer.

Next, a polyimide film was formed in the same manner as in Example 5 and the results of measurements of a film thickness, imidization rate and optical transmittance thereof are shown in the following table.

TABLE 5

| Polyimide film | Doctor Blade (μm) | Film thickness (μm) | Imidization rate (%) | Optical Transmittance (%) | |
|---|---|---|---|---|---|
| | | | | 350 (nm) | 400 (nm) |
| 1 | 25 | 0.837 | 95 | 90 | 96 |
| 2 | 200 | 4.59 | 95 | — | 65 |

Figure 5:
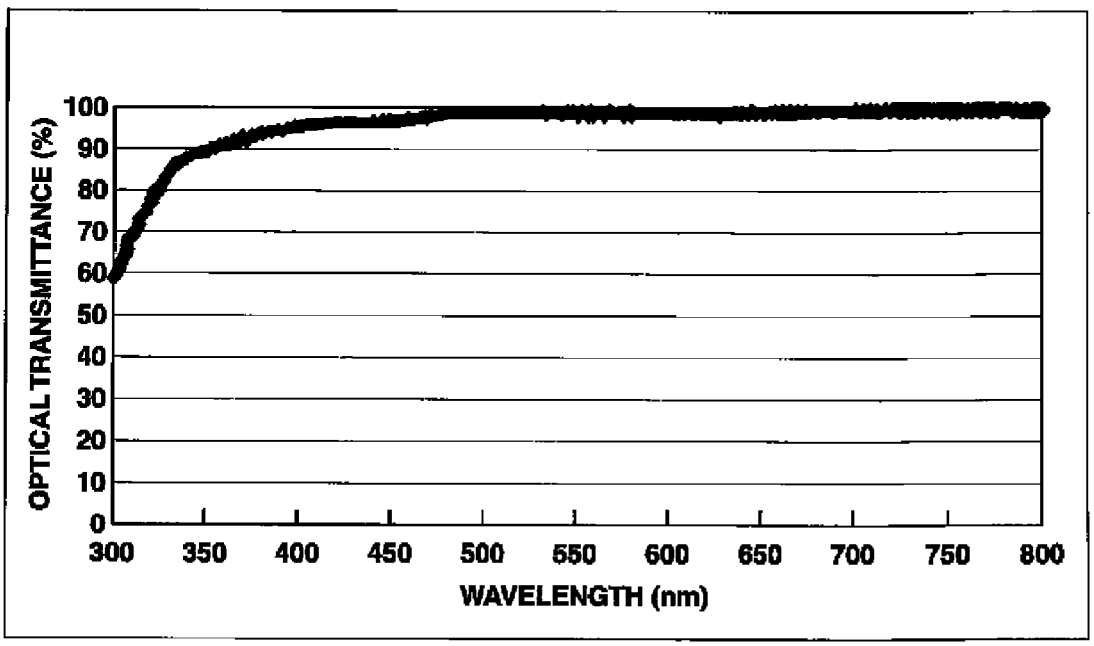
FIG. 5 is a UV-Vis spectrum chart of a 0.837 μm thick BCPDA/DCHM polyimide.

With the fully alicyclic polyimide film having a thickness of 0.837 μm, the optical transmittance at 350 nm arrived at 90% (see FIG. 5).

Further, the BCPDA-DCHM polyamic acid solution was coated onto a glass plate by use of a 200 μm doctor blade and baked on a hot plate at 100° C. for 30 minutes and then at 160° C. for 1 hour to form a polyimide film. The results are shown in the following table.

TABLE 6

| Polyimide film | Doctor Blade (μm) | Film thickness (μm) | Imidization rate (%) | Optical Transmittance (%) | | |
|---|---|---|---|---|---|---|
| | | | | 300 (nm) | 350 (nm) | 400 (nm) |
| 3 | 200 | 4.6 | 85 | 70 | 90 | 93 |

Figure 6:
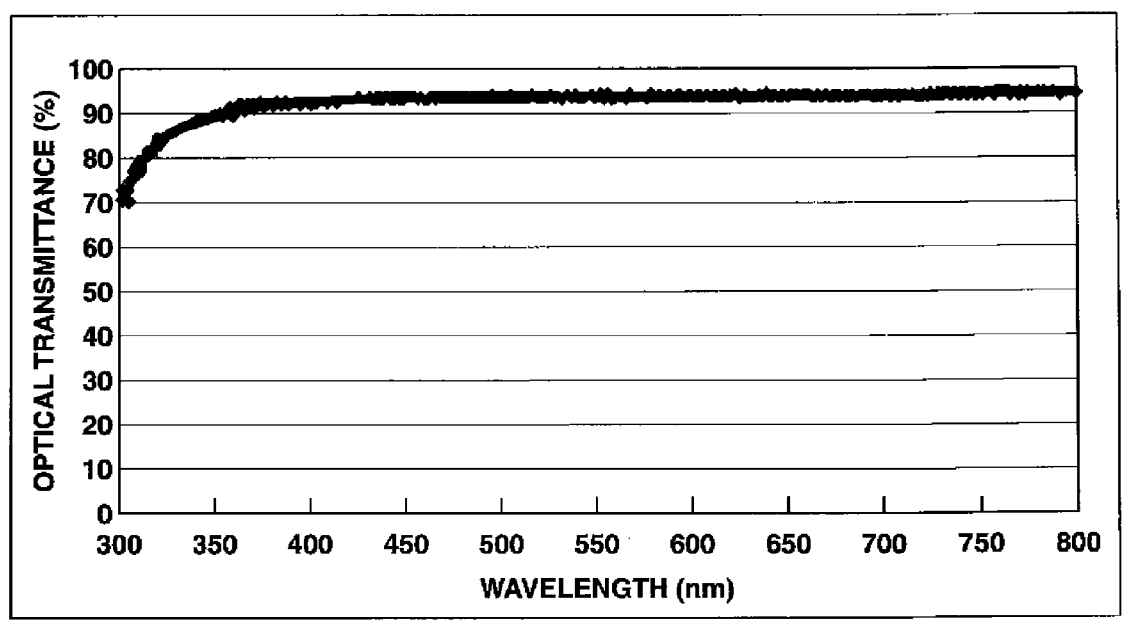
FIG. 6 is a UV-Vis spectrum chart of a 4.6 μm thick BCPDA/DCHM polyimide.

With the fully alicyclic polyimide film having a thickness of 4.6 μm, the optical transmittance at 350 nm arrived at 90% (see FIG. 6).

Comparative Example 1

Synthesis of CBDA-DCHM Polyamic Acid and Polyimide

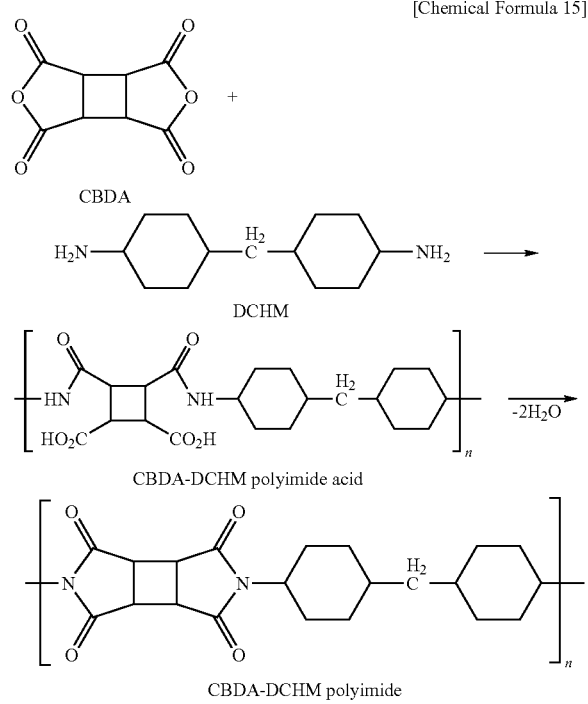

[Chemical Formula 15]

Into a dried four-necked reaction flask, 1.05 g (5.00 mmols) of 4,4'-diaminodichclohexylmethane (DCHM) and 11.5 g (solid content of 15 wt %) of cresol were charged followed by dissolution under stirring at 18° C. (room temperature) by use of a mechanical stirrer. Subsequently, 0.980 g (5.00 mmols) of 1,2,3,4-cyclobutanetracarboxylic acid-1,2:3,4-dianhydride (CBDA) was added to and stirred at 45° C. at a rate of 160 rpm for 1 hour by use of the mechanical stirrer, followed by further stirring at 20° C. at a rate of 160 rpm for 23 hours.

Next, the resulting CBDA-DVHM polyamic acid polymerization solution was coated by dropping on a 8 cm×10 cm glass plate by use of a pipette. Subsequently, after pre-baking on a hot plate at 100° C. for 30 minutes, the glass plate was placed in a dryer at 160° C. for baking for 1 hour to form a polyimide film. The resulting film was transparent and was broken into pieces, thereby not permitting it to be peeled off as a single film. The thickness of part of the pieces was measured, revealing that the thickness was at 14.5 μm.

As will be apparent from the above, the polyimide obtained from 1,2,3,4-cyclobutanetracarboxylic acid-1,2:3,4-dianhydride (CBDA), which is typical of a existing employed alicyclic tetracarboxylic acid dianhydride, and an alicyclic diamine is brittle and cannot be used as a film.

The invention claimed is:

1. A polyamic acid, characterized by comprising not less than 10 mole % of repeating units represented by the formula [1]

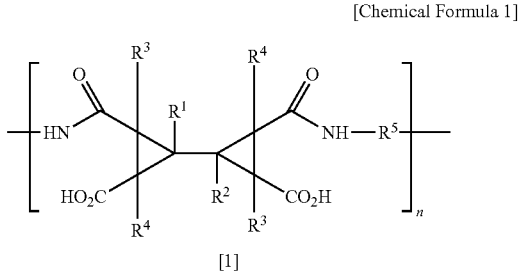

[Chemical Formula 1]

[1]

(wherein $R^1$ and $R^2$ independently represent a hydrogen atom or an alkyl group having 1 to 10 carbon atoms, $R^3$ and $R^4$ independently represent a hydrogen atom, a halogen atom, an alkyl group having 1 to 10 carbon atoms or a phenyl group, or $R^3$ and $R^4$ on adjacent carbon atoms may be combined together to form a cycloakyl group having 3 to 8 carbon atoms or a phenyl group, $R^5$ represents a divalent organic group, and n indicates an integer of 2 or over).

2. A polyimide, characterized by comprising not less than 10 mole % of repeating units represented by the formula [2]

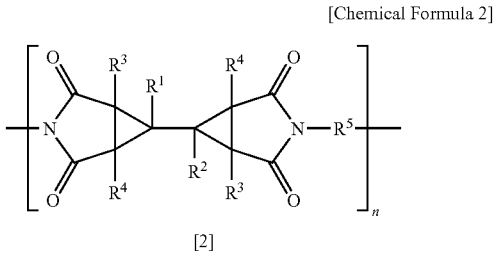

[Chemical Formula 2]

[2]

(wherein $R^1$ and $R^2$ independently represent a hydrogen atom or an alkyl group having 1 to 10 carbon atoms, $R^3$ and $R^4$ independently represent a hydrogen atom, a halogen atom, an alkyl group having 1 to 10 carbon atoms or a phenyl group, or $R^3$ and $R^4$ on adjacent carbon atoms may be combined together to form a cycloalkyl group having 3 to 8 carbon atoms or a phenyl group, $R^5$ represents a divalent organic group, and n indicates an integer of 2 or over).

3. The polyamic acid according to claim 1, wherein a number average molecular weight is 5000 or over.

4. The polyamic acid according to claim 1, wherein $R^1$, $R^2$, $R^3$ and $R^4$ are each a hydrogen atom.

5. The polyamic acid according to claim 1, wherein $R^1$ and $R^2$ are each a hydrogen atom and at least one of $R^3$ and $R^4$ is a methyl group.

6. The polyimide according to claim 2, wherein $R^1$, $R^2$, $R^3$ and $R^4$ are each a hydrogen atom.

7. The polyimide according to claim 2, wherein $R^1$ and $R^2$ are each a hydrogen atom and at least one of $R^3$ and $R^4$ is a methyl group.

8. The polyamic acid according to claim 1, wherein $R^5$ in the formula [1] is a divalent organic group derived from an alicyclic diamine or an aliphatic diamine.

9. The polyimide according to claim 2, wherein $R^5$ in the formula [2] is a divalent organic group derived from an alicyclic diamine or an aliphatic diamine.

* * * * *